United States Patent
Amano

(10) Patent No.: US 8,226,248 B2
(45) Date of Patent: Jul. 24, 2012

(54) PROJECTION DISPLAY DEVICE WITH SHIFT MECHANISM FOR DISPLACING AN IMAGER

(75) Inventor: Ryuhei Amano, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 320 days.

(21) Appl. No.: 12/652,078

(22) Filed: Jan. 5, 2010

(65) Prior Publication Data

US 2010/0171938 A1 Jul. 8, 2010

(30) Foreign Application Priority Data

Jan. 7, 2009 (JP) .................................... 2009-1330

(51) Int. Cl.
G03B 21/14 (2006.01)
G03B 3/00 (2006.01)

(52) U.S. Cl. ........................................ 353/119; 353/101

(58) Field of Classification Search .................. 353/119, 353/100, 101, 74; 352/242, 243; 359/811, 359/813, 819, 822, 694; 349/5, 7; 348/745
See application file for complete search history.

(56) References Cited

U.S. PATENT DOCUMENTS

2005/0213052 A1* 9/2005 Keith et al. ..................... 353/94

FOREIGN PATENT DOCUMENTS

| JP | 05-100312 A | 4/1993 |
| JP | 2006-235516 A | 9/2006 |
| JP | 2008-185709 A | 8/2008 |

* cited by examiner

*Primary Examiner* — Pascal M Bui Pho
(74) *Attorney, Agent, or Firm* — Marvin A. Motsenbocker; Mots Law, PLLC

(57) ABSTRACT

A projection display device includes an imager which modulates light from a light source based on an image signal; a projection optical system which enlarges and projects the light modulated by the imager onto a projection plane; and a shift mechanism which displaces the imager in a direction intersecting with an optical axis of the projection optical system. The projection optical system and the shift mechanism are co-mounted on a base member.

2 Claims, 14 Drawing Sheets

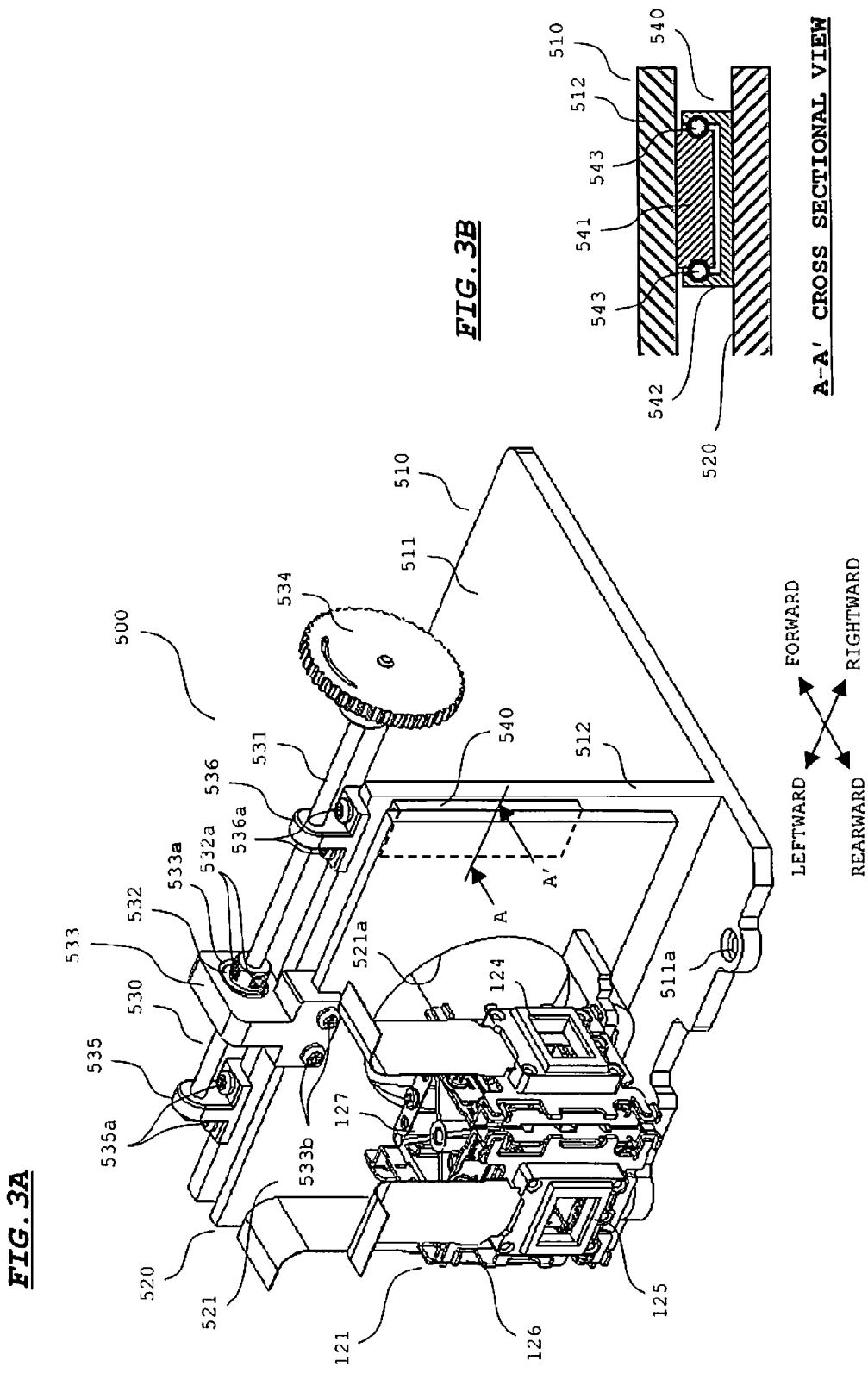

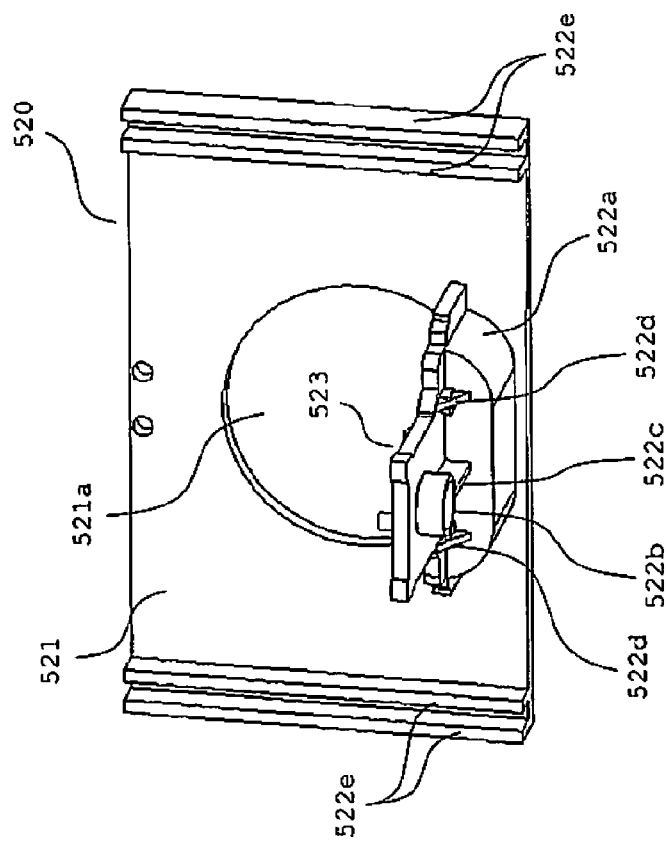
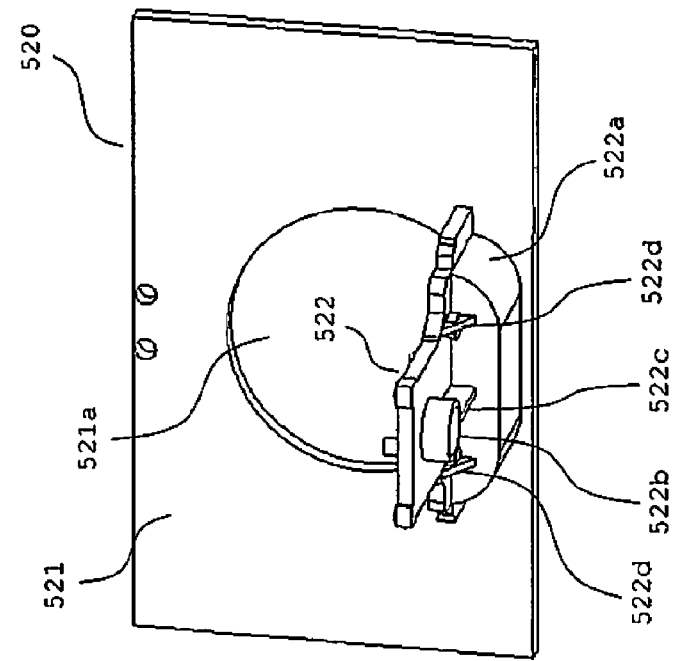

UPPERMOST POSITION

INTERMEDIATE POSITION

LOWERMOST POSITION

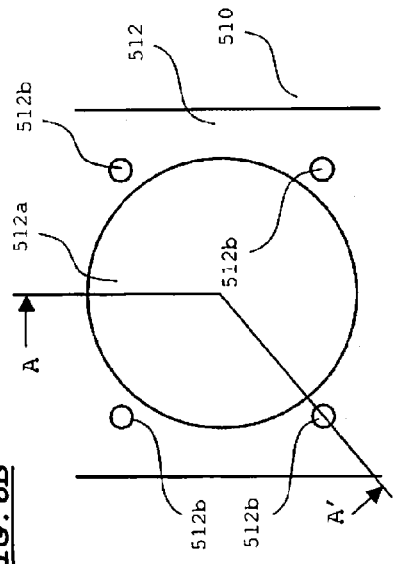
FIG. 6B
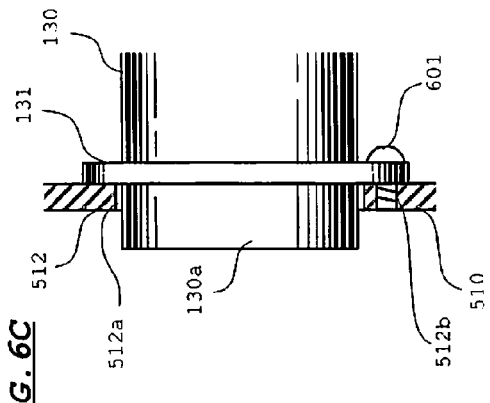
FIG. 6C   A-A' CROSS SECTIONAL VIEW
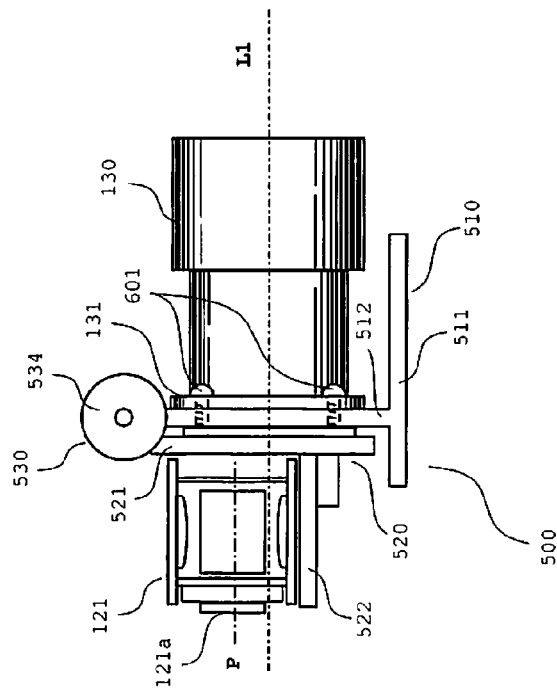
FIG. 6A

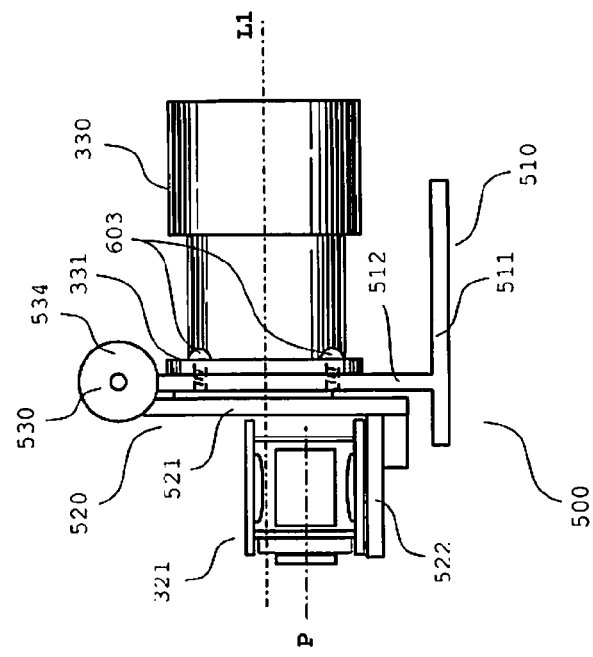
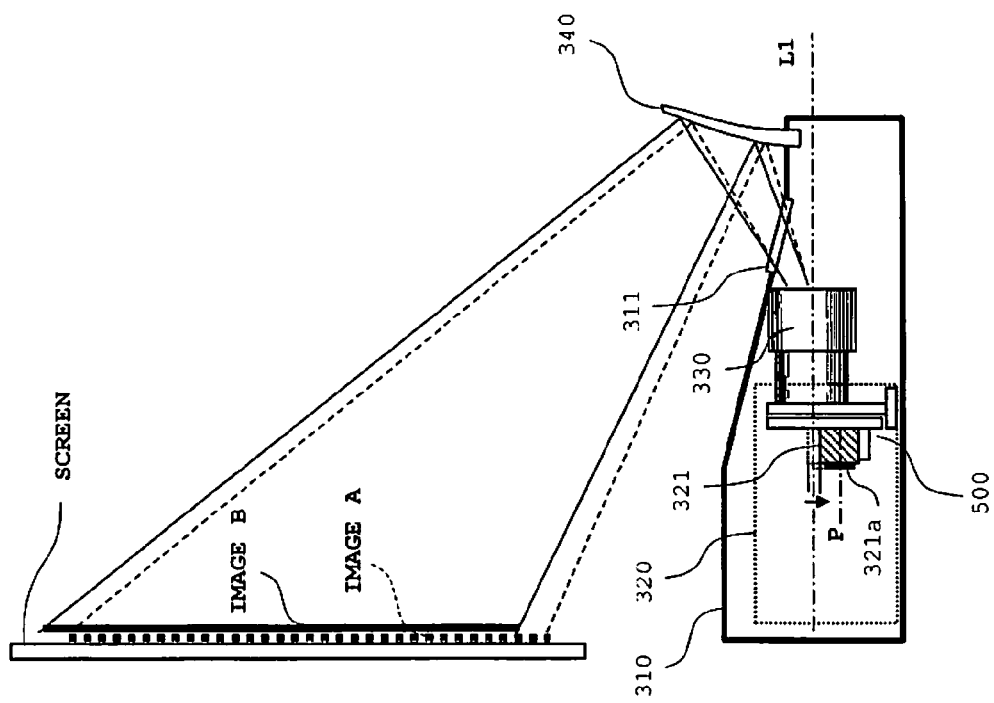
FIG.10A
FIG.10B

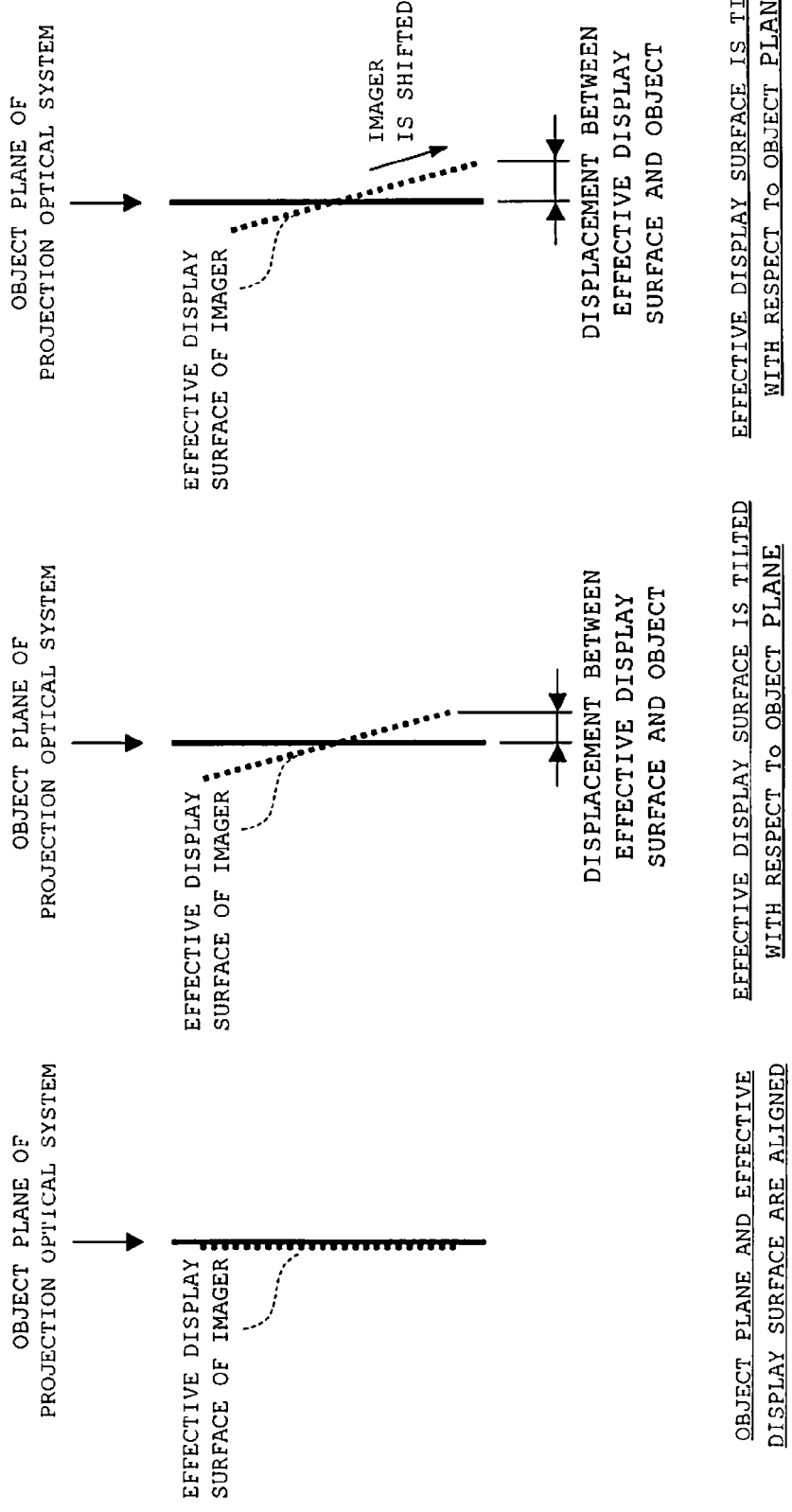

PROJECTION DISPLAY DEVICE WITH SHIFT MECHANISM FOR DISPLACING AN IMAGER

This application claims priority under 35 U.S.C. Section 119 of Japanese Patent Application No. 2009-1330 filed Jan. 7, 2009, entitled "PROJECTION DISPLAY DEVICE". The disclosers of the above application is incorporated herein by reference.

BACKGROUND OF THE INVENTION

1. Field of the Invention

The present invention relates to a projection display device for enlarging and displaying an image on an imager onto a projection plane, and more particularly to a projection display device of a type for projecting projection light onto a projection plane in an oblique direction.

2. Description of the Related Art

Currently, a projection display device (hereinafter, called as a "projector") of a type for enlarging and projecting an image on an imager (such as a liquid crystal panel) onto a projection plane (such as a screen) has been commercialized and widely used. In the projector of this type, various methods have been proposed to reduce the throw distance. The "throw distance" is a distance from a projection opening of a projector or a most downstream optical component of a projection optical system to a flat plane including a projection plane. If the throw distance is reduced, for instance, projection light is less likely to be blocked by an obstacle, thereby increasing the operability of a projector, and usability for a user.

As a method for reducing the throw distance, there is proposed an arrangement of increasing the view angle of a projection optical system, and tilting the propagating direction of projection light with respect to an optical axis of the projection optical system. For instance, a wide angle lens having a large view angle is used as a projection optical system, and an imager and a screen are displaced in directions opposite to each other with respect to an optical axis of the projection optical system. This enables to reduce the throw distance.

As another arrangement, a refractive optical system and a reflection optical system are used as a projection optical system. In this arrangement, an image on an imager is formed between the refractive optical system and the reflection optical system, as an intermediate image. The intermediate image is enlarged and projected onto a screen in an oblique direction by the reflection optical system (a curved surface mirror). This enables to reduce the throw distance.

In the projector of oblique projection type, the size of a projected image (hereinafter, called as a "projection size") can be adjusted by changing the throw distance, as necessary. For instance, reducing the throw distance by disposing a projector main body closer to a screen enables to reduce the projection size. Further, increasing the throw distance by disposing the projector main body away from the screen enables to increase the projection size.

In the arrangement of projecting projection light with a wide view angle and in an oblique direction, if the throw distance is changed, the position of a projected image may be greatly displaced vertically on a projection plane depending on a change in the throw distance. In view of this, in the case where the projection size should be changed during a projecting operation, it is necessary to quickly correct the position of a projected image, depending on a change in the throw distance to change the projection size.

In view of the above, there is proposed an arrangement provided with a shift mechanism for moving an imager in a vertical direction with respect to an optical axis of a projection optical system to adjust the position of a projected image. Use of the shift mechanism enables to easily adjust the position of a projected image, without the need of moving a projector itself to adjust the position of a projected image.

In a projector, it is necessary to accurately position an effective display surface of an imager with respect to an object plane of a projection optical system. If the effective display surface is displaced from the object plane, a projected image may be blurred. In particular, in the projector of oblique projection type as described above, a small displacement of the effective display surface with respect to the object plane causes a blur in a projected image. In view of this, it is necessary to strictly adjust the distance between a projection optical system and an imager (the effective display surface) in the projector of oblique projection type.

As shown in FIG. 14B, an effective display surface may be displaced with respect to an object plane, if the effective display surface is tilted with respect to the object plane. If the effective display surface is tilted with respect to the object plane, a displacement amount between an end portion of the effective display surface and the object plane in the tilted direction is increased. As a result, a projected image in an area corresponding to the end portion where the displacement amount is large may be greatly blurred.

Further, if the imager is shifted in a state that the effective display surface is tilted as described above, as shown in FIG. 14C, the displacement between the end portion of the effective display surface and the object plane is further increased. As a result, the projected image is increasingly blurred.

As described above, in the arrangement of shifting an imager, the positional relation between the imager and the projection optical system is required to be properly maintained, while shifting the imager. Thus, there is a demand for a method for mounting an imager and a projection optical system in a projector with high precision.

SUMMARY OF THE INVENTION

A projection display device according to a primary aspect of the invention includes an imager which modulates light from a light source based on an image signal; a projection optical system which enlarges and projects the light modulated by the imager onto a projection plane; and a shift mechanism which displaces the imager in a direction intersecting with an optical axis of the projection optical system. The projection optical system and the shift mechanism are co-mounted on a base member.

In the projection display device according to the primary aspect of the invention, since the number of members to be interposed between the shift mechanism and the projection optical system can be reduced, a positional error between the imager and the projection optical system in a mounting process can be suppressed. Accordingly, the imager and the projection optical system can be mounted with a precise positional relation.

BRIEF DESCRIPTION OF THE DRAWINGS

The foregoing and other objects, and novel features of the present invention will become more apparent upon reading the following detailed description of the embodiments along with the accompanying drawings.

FIGS. 3A and 3B are diagrams showing an arrangement of a shift module in the first embodiment.

FIGS. 4A and 4B are diagrams showing an arrangement of a fixing member in the first embodiment.

FIGS. 6A, 6B, and 6C are diagrams showing a structure as to how a refractive optical system is mounted on a base member in the first embodiment.

FIGS. 10A and 10B are diagrams showing an arrangement of a projector in accordance with a third embodiment of the invention.

FIGS. 14A, 14B, and 14C are diagrams for describing a problem to be solved in a projector having a shift mechanism.

Figure 1:
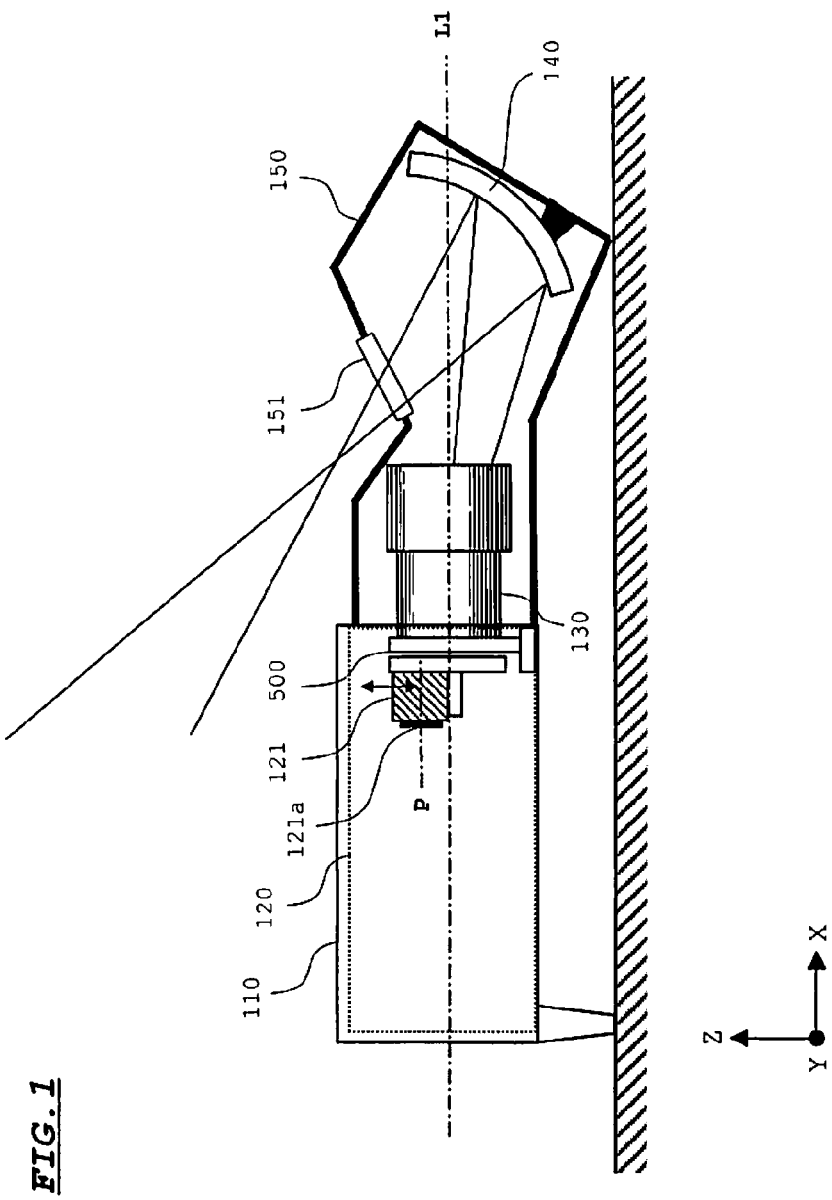
FIG. 1 is a diagram showing an arrangement of a projector in accordance with a first embodiment of the invention.

The drawings are provided mainly for describing the present invention, and do not limit the scope of the present invention.

DESCRIPTION OF THE PREFERRED EMBODIMENTS

In the following, embodiments of the invention are described referring to the drawings.

First Embodiment

FIG. 1 is a diagram showing an arrangement of a projector in accordance with a first embodiment of the invention. As shown in FIG. 1, the projector includes a cabinet 110, an optical engine 120, a refractive optical system 130, a reflection mirror 140, and a cover 150.

The optical engine 120 is housed in the cabinet 110. The optical engine 120 generates light modulated in accordance with an image signal (hereinafter, called as image light"). The refractive optical system 130 having a plurality of lenses is mounted on the optical engine 120. Image light emitted from the optical engine 120 is entered into the refractive optical system 130.

In this embodiment, the optical engine 120 includes an imager unit 121 constituted of an imager 121a. The imager unit 121 is provided in the optical engine 120 at such a position that a center P of an effective display surface of the imager 121a is displaced upwardly from an optical axis L1 of the refractive optical system 130. The imager unit 121 is held on a shift module 500 to be displaceable in a vertical direction (a direction perpendicular to the optical axis L1).

The reflection mirror 140 is provided at a forward position of the refractive optical system 130. The reflection mirror 140 has a concave reflection surface of an aspherical shape or a free curved shape, and has an effective reflection area at a lower position (on the side opposite to a projection opening 151) with respect to the optical axis L1 of the refractive optical system 130. Image light emitted from the refractive optical system 130 is reflected on the reflection mirror 140.

The refractive optical system 130 and the reflection mirror 140 are covered by the cover 150. The cover 150 is formed with the projection opening 151 through which image light reflected on the reflection mirror 140 is passed.

The image light reflected on the reflection mirror 140 is maximally converged at a position near the projection opening 151, enlarged, and projected onto a screen.

Figure 2:
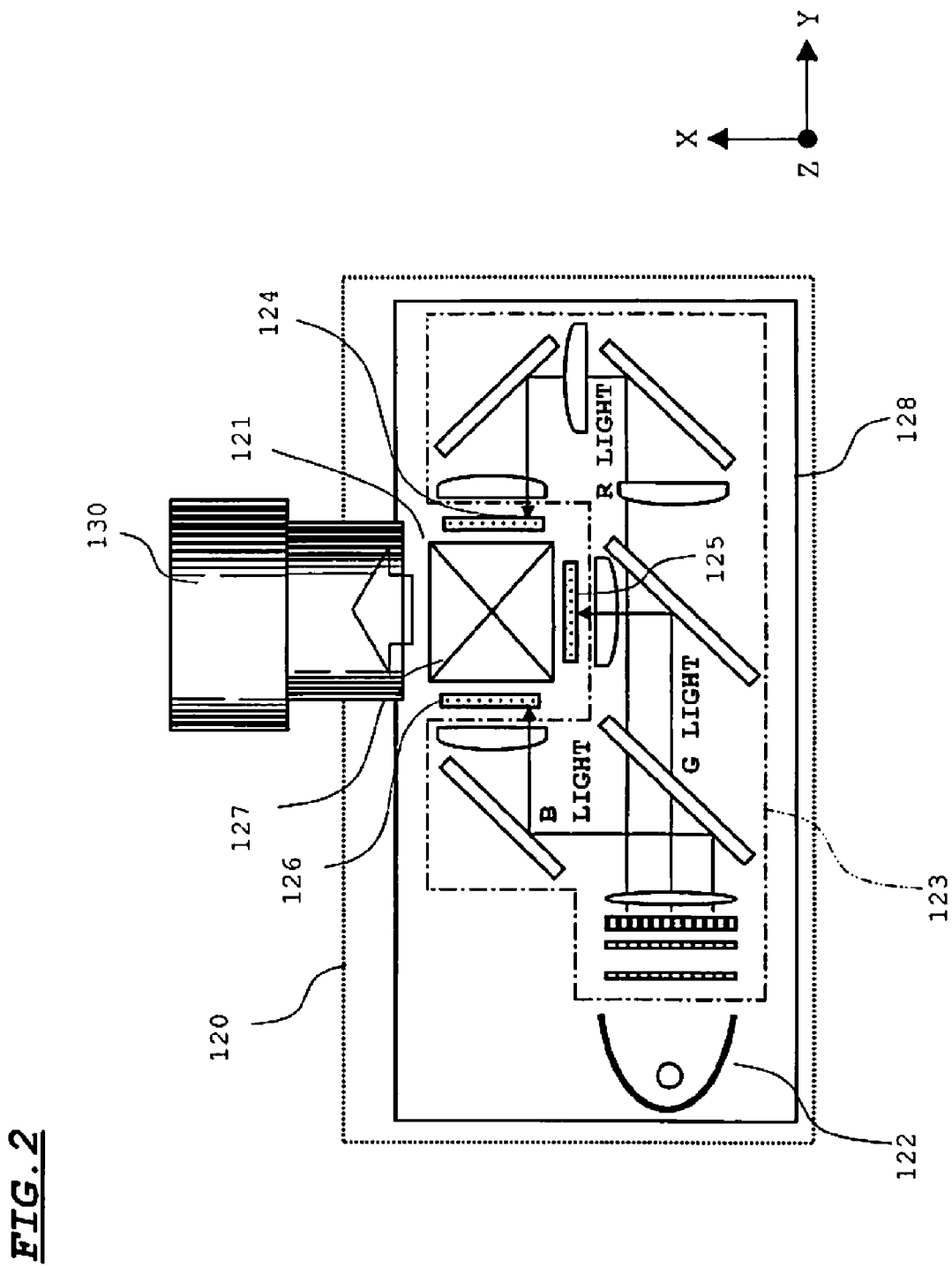
FIG. 2 is a diagram showing an arrangement of an optical engine in the first embodiment.

FIG. 2 is a diagram showing an arrangement of the optical engine 120. FIG. 2 is a perspective view showing the interior of the optical engine 120 from above.

As shown in FIG. 2, the optical engine 120 includes a light source 122, a light guiding optical system 123, three transmissive liquid crystal panels 124, 125, and 126 as the imager 121a, and a dichroic prism 127. An unillustrated incident-side polarizer and output-side polarizer are provided at each of the liquid crystal panels 124, 125, and 126. The liquid crystal panels 124, 125, and 126, and the dichroic prism 127 are integrally formed into the imager unit 121. These optical components are provided in a housing 128.

White light emitted from the light source 122 is separated into light in a red wavelength band (hereinafter, called as "R light"), light in a green wavelength band (hereinafter, called as "G light"), and light in a blue wavelength band (hereinafter, called as "B light") by the light guiding optical system 123, and the R light, the G light, and the B light are irradiated into the liquid crystal panels 124, 125, and 126. The R light, the G light, and the B light modulated by the liquid crystal panels 124, 125, and 126 are color-combined by the dichroic prism 127, and the combined light is emitted as image light.

As described above, the imager unit 121 is held on the shift module 500.

FIGS. 3A and 3B are diagrams showing an arrangement of the shift module 500. FIG. 3A is a perspective view of the shift module 500. FIG. 3B is a diagram for describing an arrangement of a linear guide 590, and is a cross-sectional view taken along a line A-A' in FIG. 3A.

The shift module 500 includes a base member 510, a fixing member 520, a displacement mechanism portion 530, and linear guides 540. The fixing member 520, the displacement mechanism portion 530, and the linear guides 590 constitute a shift mechanism for shifting the imager 121a. The refractive optical system 130 and the shift mechanism are co-mounted on the base member 510 (see FIG. 6A).

The base member 510 includes a seat portion 511, and a support plate 512 extending perpendicularly (upwardly) with respect to the seat portion 511.

The seat portion 511 is formed with mounting holes 511a (only the right-side mounting hole 511a is shown in FIG. 3A) at right and left positions on a rear surface thereof. The base member 510 is screw-fastened to a predetermined position of the housing 128 through the mounting holes 511a.

The fixing member 520 is mounted on a rear surface of the support plate 512 through the right and left linear guides 540 (only the right-side linear guide 540 is shown in FIG. 3A).

As shown in FIG. 3B, the linear guide 540 includes a rail portion 541 extending in a vertical direction, and a stage portion 542 which is engaged with the rail portion 541 and is movable in a vertical direction along the rail portion 541. Ball bearings 543 are arranged at a predetermined interval vertically along both lateral surfaces of the rail portion 541. With use of the ball bearings 543, the stage portion 542 is smoothly moved along the rail portion 541. The rail portion 541 is fixed to the support plate 512, and the stage portion 542 is fixed to the fixing member 520.

Thus, the fixing member 520 is supported on the support plate 512 to be vertically displaceable by the right and left linear guides 540.

FIGS. 4A and 4B are diagrams showing an arrangement of the fixing member 520. FIG. 9A shows an arrangement of the fixing member 520 in this embodiment, and FIG. 4B shows a modification of the fixing member 520.

As shown in FIG. 4A, the fixing member 520 has a flat plate portion 521 extending along the support plate 512. The flat plate portion 521 is formed with an opening 521a through which image light from the imager unit 121 is passed. The flat plate portion 521 is integrally formed with a placement portion 522. The imager unit 121 is placed on the placement portion 522 (see FIG. 3A). A placement surface of the placement portion 522 extends vertically with respect to the flat plate portion 521 and the support plate 512.

A receiving portion 522a is integrally formed with the flat plate portion 521 at a base end on a back surface of the placement portion 522. The strength of the base end of the placement portion 522 is reinforced by the receiving portion 522a. A mounting boss 522b for screw-fastening the imager unit 121 is formed at a tip end on the back surface of the placement portion 522.

A reinforcing rib 522c is formed on the back surface of the placement portion 522 in such a manner as to connect the receiving portion 522a and the mounting boss 522b. Two reinforcing ribs 522d integrally formed with the receiving portion 522a are formed on both sides of the reinforcing rib 522c on the back surface of the placement portion 522. The reinforcing ribs 522c and 522d each extends in the same direction as the projecting direction of the placement portion 522 from the flat plate portion 521.

As described above, the placement portion 522 is reinforced by the receiving portion 522a, the mounting boss 522b, and the reinforcing ribs 522c and 522d. This enables to prevent the tip end of the placement portion 522 from deforming downwardly by the weight of the imager unit 121. Further, the imager unit 121 is heated to a high temperature by light to be irradiated. Accordingly, the placement portion 522 is likely to be heated to a high temperature. The above reinforcing mechanism enables to prevent the placement portion 522 from thermal deformation.

As shown in FIG. 4B, vertically extending reinforcing ribs 522e may be formed on the flat plate portion 521. The modification is advantageous in preventing an upper part of the flat plate portion 521 from tilting in forward or backward direction by the weight or a heat of the imager unit 121. In the modification, each two reinforcing ribs 522e are formed on both right and left ends of the flat plate portion 521.

Referring back to FIG. 3A, the fixing member 520 is shifted in a vertical direction i.e. in a direction perpendicular to the optical axis L1 of the refractive optical system 130 by the displacement mechanism portion 530.

The displacement mechanism portion 530 includes a shaft 531, an eccentric cam 532, a displacing member 533, a knob 534, and two bearing portions 535 and 536.

The eccentric cam 532 is fixed to the shaft 531 by two screws 532a. Both ends of the shaft 531 are rotatably supported by the bearing portions 535 and 536, with the eccentric cam 532 being sandwiched between the bearing portions 535 and 536. The bearing portions 535 and 536 are fixed to an upper end of the support portion 512 by each two screws 535a and 536a, respectively.

The eccentric cam 532 is received in a cam hole 533a of the placing member 533. The eccentric cam 532 has such a shape as to obtain an intended displacement amount of the imager unit 121. The displacing member 533 is fixed to an upper end of the flat plate portion 521 by two screws 533b.

Alternatively, the bearing portions 535 and 536 may be integrally formed with the support plate 521. Further alternatively, the displacing member 533 may be integrally formed with the flat plate portion 521.

The knob 534 is attached to an end of the shaft 531. The knob 534 is exposed from an outer surface of the cabinet 110 (see FIG. 1), and is pivotally operable by the user.

FIGS. 5A, 5B, 5C, and 5D are diagrams for describing a shift operation to be performed by the shift mechanism.

Figure 5C:
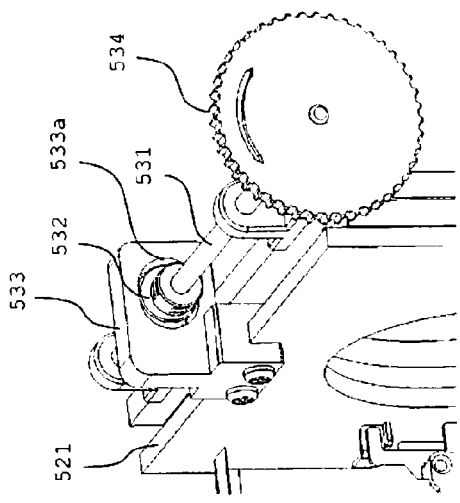
FIGS. 5A, 5B, 5C, and 5D are diagrams for describing a shift operation to be performed by a shift mechanism in the first embodiment.
Figure 5B:
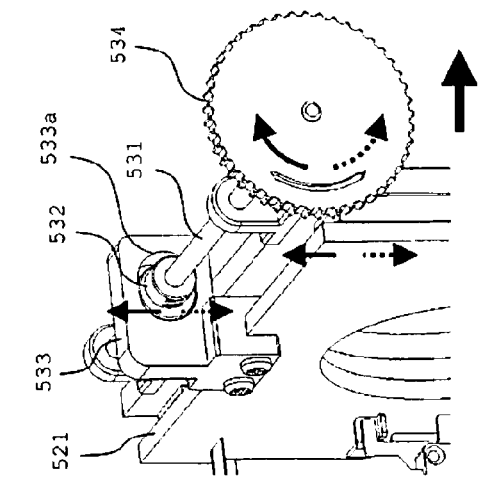
Figure 5D:
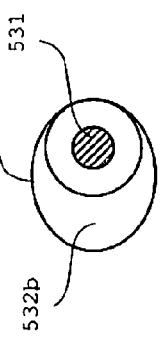

For instance, if the knob 534 is pivotally rotated clockwise (in the direction shown by the solid arrow in FIG. 5B) by the user from the intermediate position shown in FIG. 5B, as shown in FIG. 5C, a wide portion 532b (see FIG. 5D) of the eccentric cam 532 is moved upwardly. Accordingly, the displacing member 533 is displaced upwardly to thereby displace the flat plate portion 521 (the fixing member 520) upwardly. Accordingly, the imager unit 121 placed on the placement portion 522 is shifted upwardly.

Figure 5A:
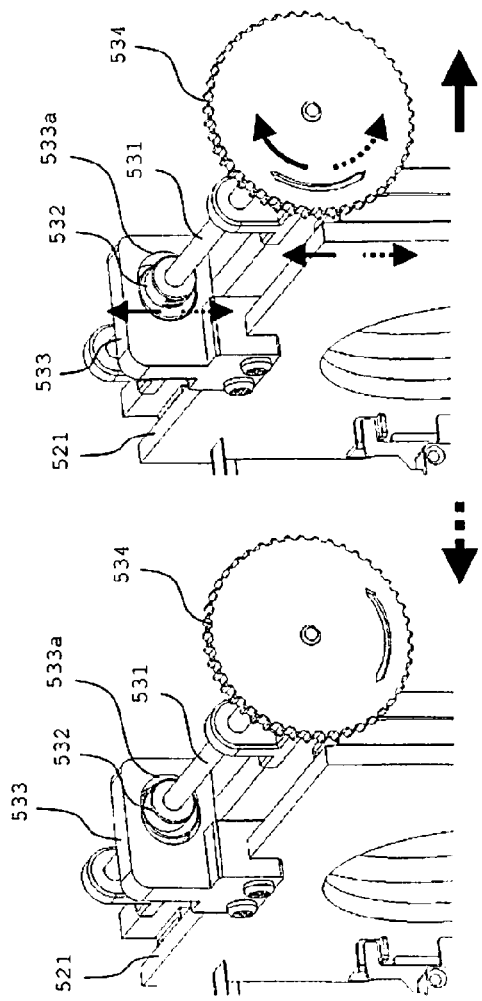

On the contrary, if the knob 534 is pivotally rotated counterclockwise (in the direction shown by the broken arrow in FIG. 5B) by the user from the intermediate position, as shown in FIG. 5A, the wide portion 532b of the eccentric cam 532 is moved downwardly. Accordingly, the displacing member 533 is displaced upwardly to thereby displace the flat plate portion 521 (the fixing member 520) downwardly. Accordingly, the imager unit 121 placed on the placement portion 522 is shifted downwardly.

A surface of the knob 534 on the side of the cabinet 110 is contacted with a side surface of the cabinet 110. A friction caused by the contact suspends the fixing member 520 i.e. the imager unit 121 at an intended position. However, the imager unit 121 may be inadvertently moved by an impact or a like external force in this state.

In view of the above, a locking device (not shown) for locking and preventing the knob 534 from pivotal rotation is provided in the displacement mechanism portion 530. When the imager unit 121 is shifted to an intended position by the user, the knob 534 is locked by the locking device. Accordingly, the imager unit 121 is fixed to an intended position. The locking device may be configured to fix e.g. the shaft 531 and the fixing plate 520, in addition to the knob 534. Further alternatively, the shaft 531 may be electrically driven by a motor or the like, in place of pivotally rotating the shaft 531 by manual operation of the knob 534.

The spot size of R light, G light, and B light to be irradiated onto the respective liquid crystal panels 124, 125, and 126 is set larger than the size of the effective display surface of the corresponding liquid crystal panel to irradiate light onto the entirety of the panel, even if the imager unit 121 is vertically displaced.

The refractive optical system 130 is mounted on the side of a front surface of the support plate 512.

FIGS. 6A, 6B, and 6C are diagrams showing a structure as to how the refractive optical system 130 is mounted on the base member 510. FIG. 6A is a side view showing a state that the shift mechanism and the refractive optical system 130 are mounted on the base member 510. FIG. 6B is a front view showing a structure of the support plate 512 for mounting the refractive optical system 130. FIG. 6C is a cross-sectional view showing a state that the refractive optical system 130 is mounted on the support plate 512.

As shown in FIG. 6B, the support plate 512 is formed with an opening 512a in which the refractive optical system 130 is received. Four threaded holes 512b are formed in the periphery of the opening 512a. As shown in FIG. 6C, a tip end 130a of the refractive optical system 130 is received in the opening 512a to such an extent that a flange portion 131 is abutted against the front surface of the support plate 512. Then, the refractive optical system 130 is fixed to the support plate 512 by fastening the flange portion 131 by screws 601.

As shown in FIG. 6A, the optical axis L1 of the refractive optical system 130 is aligned perpendicular to the support plate 512 in the above state. Accordingly, the optical axis L1 and a normal passing the center P of the effective display surface of the imager 121a are aligned in parallel to each other. Since the fixing member 520 and the refractive optical system 130 are co-mounted on the support plate 512, even if the support plate 512 is tilted from a vertical state, the optical axis L1 of the refractive optical system 130 and the normal passing the center P of the effective display surface of the imager 121a are kept in a parallel state. In other words, the positional relation between the imager 121a and the refractive optical system 130 is kept with precision.

Figure 7B:
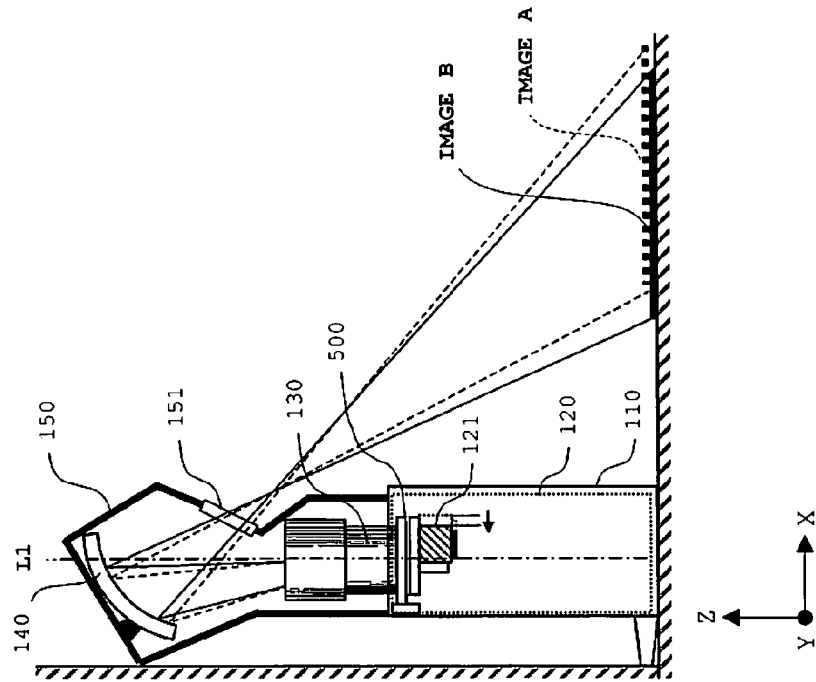
FIGS. 7A and 7B are diagrams for describing an operation of adjusting the position of a projected image in the first embodiment.
Figure 7A:
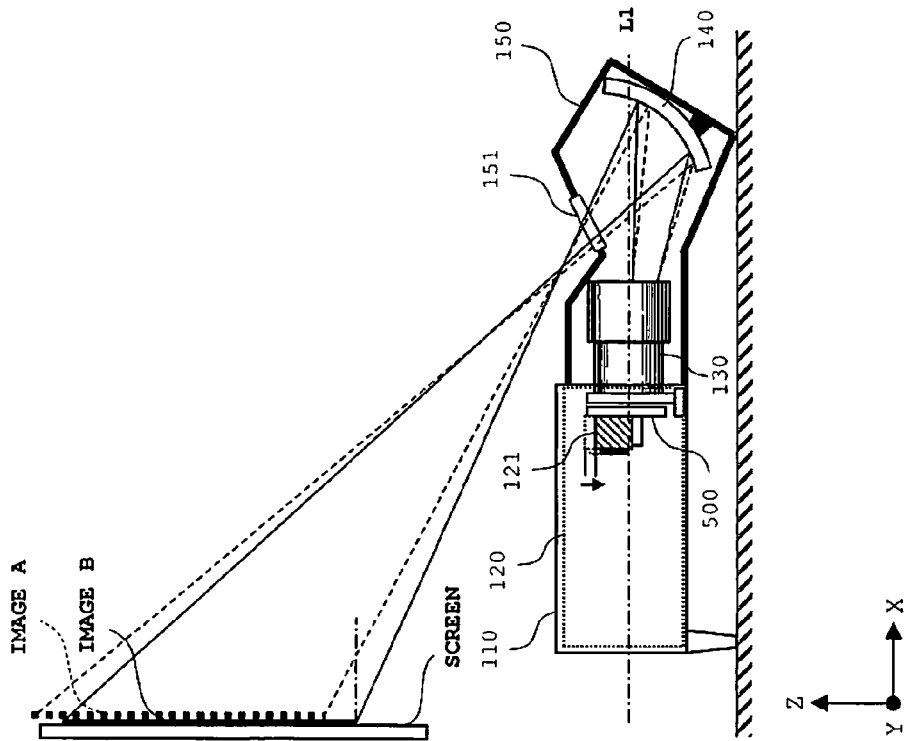

FIGS. 7A and 7B are diagrams for describing an operation of adjusting the position of a projected image. FIG. 7A shows a state that the projector is installed in a horizontal position to project an image on a screen, and FIG. 7B shows a state that the projector is installed in a vertical position to project an image on a floor surface (a desk surface).

Referring to FIG. 7A, for instance, in the case where the imager unit 121 is located at an upper position i.e. a position away from the optical axis L1, and an upper part of a projected image A is out of the screen, the user pivotally rotates the knob 534 to shift the imager unit 121 downwardly.

Accordingly, the imager unit 121 is moved closer to the optical axis L1, and a principal ray position defined by an upper end and a lower end of image light emitted from the refractive optical system 130 (hereinafter, the "principal ray position defined by the upper end and the lower end" is simply called as a "light ray position") is changed from the light ray position indicated by the broken line in FIG. 7A to the light ray position indicated by the solid line in FIG. 7A. Specifically, the light ray position of image light emitted from the refractive optical system 130 comes closer to the optical axis L1, whereby the incident position of image light into the reflection mirror 140 is displaced upwardly. Accordingly, the light ray position of image light which is reflected on the reflection mirror 140 and directed to the screen is lowered. As a result, the position of the image projected on the screen is lowered, and an image B is properly projected on the screen.

Similarly to the above, in the case where the projector is installed in a vertical position as shown in FIG. 7B, the position of a projected image can be adjusted in forward or backward direction with respect to the projector by shifting the imager unit 121.

As described above, in this embodiment, the position of a projected image can be easily adjusted by merely performing an operation of shifting the imager unit 121.

In the projector of oblique projection type as shown in this embodiment, it is necessary to strictly adjust the distance between the refractive optical system 130 and the imager 121a (the effective display surface). A small displacement of the effective display surface with respect to the object plane of the projection optical system constituted of the refractive optical system 130 and the reflection mirror 140 causes a blur in a projected image. Accordingly, it is necessary to accurately position the effective display surface of the imager 121a with respect to the object plane of the projection optical system to prevent the above drawback.

As described referring to FIGS. 14B and 14C, the effective display surface is also displaced with respect to the object plane, resulting from tilt of the effective display surface with respect to the object plane. If the imager unit 121 is shifted in a state that the effective display surface is tilted as described above, the displacement between the end portion of the effective display surface and the object plane is increased. In view of this, it is necessary to prevent the effective display surface from tilting with respect to the object plane.

In this embodiment, the shift mechanism (the fixing member 520) for the imager unit 121, and the refractive optical system 130 are co-mounted on the base member 510. Since only the base member 510 is interposed between the shift mechanism and the refractive optical system 130, it is only required to precisely mount the shift mechanism and the refractive optical system 130 on the base member 510.

Thus, in this embodiment, since the imager 121a and the refractive optical system 130 can be mounted with precision, the distance between the imager 121a and the refractive optical system 130 can be properly maintained. Accordingly, a blur in a projected image resulting from positional displacement of the imager with respect to the object plane can be prevented.

In this embodiment, since the fixing member 520 and the refractive optical system 130 are co-mounted on the support plate 512, even if the support plate 512 is tilted from a vertical state, there is no likelihood that the effective display surface of the imager 121a may be tilted with respect to the object plane of the refractive optical system 130. Accordingly, the distance between the imager 121a and the refractive optical system 130 can be further securely maintained.

Furthermore, in this embodiment, deformation of the placement portion 522 is suppressed by the reinforcing ribs 522c and 522d, and deformation of the flat plate portion 521 is suppressed by the reinforcing ribs 522e. Accordingly, this arrangement is further advantageous in preventing the effective display surface of the imager 121a from tilting with respect to the object plane of the refractive optical system 130.

Second Embodiment

Figure 8A:
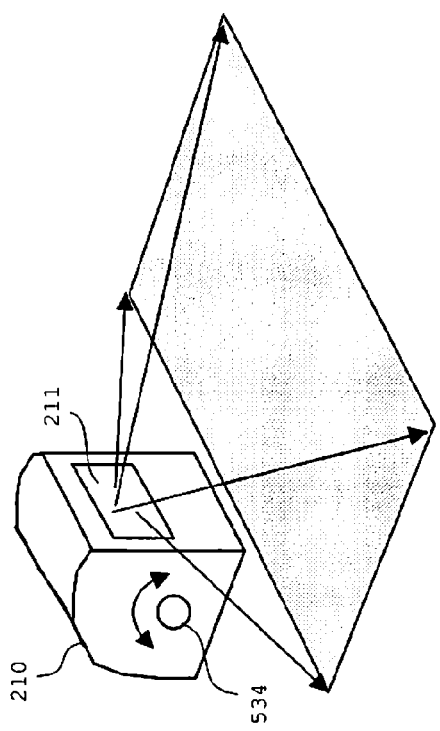
FIGS. 8A and 8B are diagrams showing an arrangement of a projector in accordance with a second embodiment of the invention.
Figure 8B:
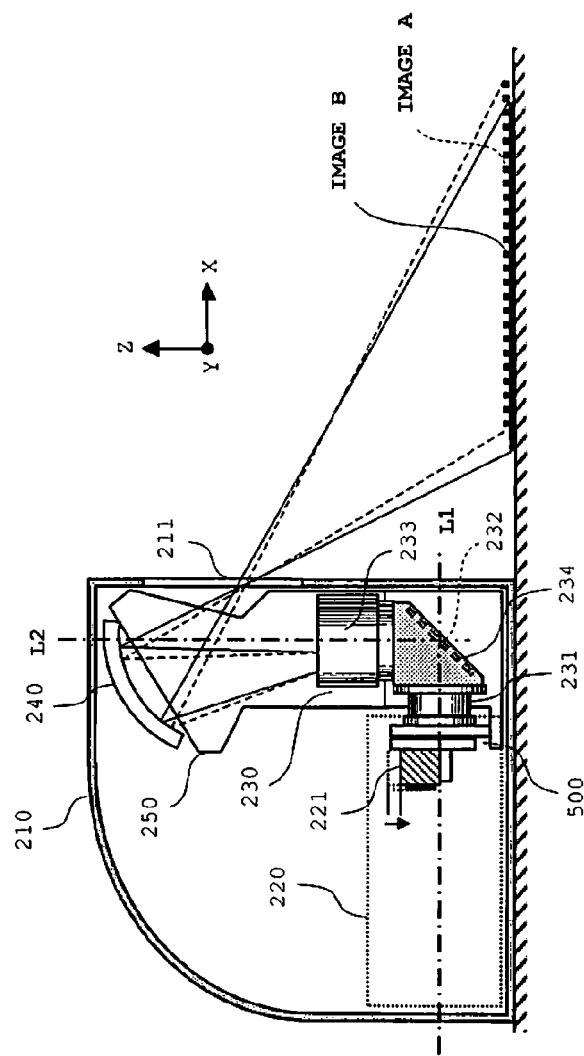

FIGS. 8A and 8B are diagrams showing an arrangement of a projector in accordance with a second embodiment of the invention. FIG. 8A is a perspective view showing an external appearance of the projector, and FIG. 8B is a perspective side view showing an internal structure of the projector.

As shown in FIG. 8A, the projector in this embodiment has an external appearance close to a cubic shape. The projector is installed in such a manner as to project an image onto an installation plane (a floor surface or a desk surface) through a projection opening 211.

As shown in FIGS. 8A and 8B, the projector has a cabinet 210. The cabinet 210 has a bulging portion from a back surface thereof toward a top surface thereof.

The cabinet 210 is internally provided with an optical engine 220, a refractive optical system 230, a curved surface mirror 240, and a housing 250.

The optical engine 220 has substantially the same arrangement as the optical engine 120 in the first embodiment, and includes an imager unit 221. The imager unit 221 is held on a shift module 500 to be displaceable in a vertical direction (a direction perpendicular to an optical axis L1).

The refractive optical system 230 includes a rear refractive optical unit 231, a reflection mirror 232, and a front refractive optical unit 233. The reflection mirror 232 is housed in a mirror case 234, and the rear refractive optical unit 231, the mirror case 234, and the front refractive optical unit 233 are integrally formed.

Image light generated in the optical engine 220 is entered into the rear refractive optical unit 231. The rear refractive optical unit 231 has a plurality of lenses, and the optical axis L1 of the lenses is aligned in parallel to a bottom surface (X-Y plane) of the cabinet 210. As shown in FIG. 8B, the imager unit 221 is disposed at a position displaced from the optical axis L1 of the rear refractive optical system 231 in Z-axis direction (in a direction toward the curved surface mirror 240). Accordingly, image light is entered into the rear refractive optical unit 231, with the center of a light flux thereof being displaced by a predetermined distance.

The reflection mirror 232 is disposed at a forward position of the rear refractive optical unit 231 with an inclination of 45 degrees with respect to the bottom surface (X-Y plane) of the cabinet 210.

The front refractive optical unit 233 is disposed above the reflection mirror 232. The front refractive optical unit 233 has a plurality of lenses. An optical axis L2 of these lenses is aligned perpendicular to the optical axis L1 of the rear refractive optical unit 231, and intersects with the optical axis L1 of the rear refractive optical unit 231 on the reflection mirror 232. In other words, the refractive optical system 230 is configured in such a manner that the optical axis of the lens group thereof is converted from a direction orthogonal to the exit surface of the imager unit 221 into a direction parallel to the exit surface by the reflection mirror 232 interposed between the rear refractive optical unit 231 and the front refractive optical unit 233.

Image light entered into the rear refractive optical unit 231 is entered into the curved surface mirror 240 disposed above the front refractive optical unit 233 through the rear refractive optical unit 231, the reflection mirror 232, and the front refractive optical unit 233.

The curved surface mirror 240 has a reflection surface of a concave shape. As shown in FIG. 8B, the curved surface mirror 240 has an effective reflection area at a position displaced from the optical axis L2 of the front refractive optical unit 233 toward the optical engine 220.

Image light entered into the curved surface mirror 240 is reflected on the curved surface mirror 240, and enlarged and projected onto a floor surface through the projection opening 211. In the projecting operation, the image light is enlarged after maximally converged at a position near the projection opening 211.

The refractive optical system 230 and the curved surface mirror 240 are mounted on the housing 250, and assembled into a projection optical unit 260. Thereafter, the projection optical unit 260 is mounted on a base member 510 of the shift module 500.

Figure 9B:
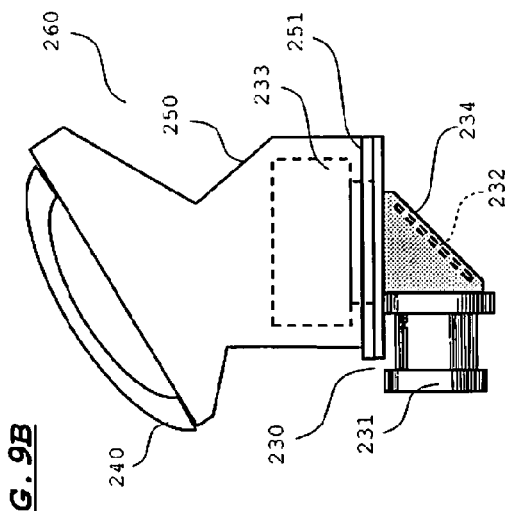
FIGS. 9A, 9B, and 9C are diagrams showing a structure as to how a projection optical unit is mounted on a base member in the second embodiment.
Figure 9C:
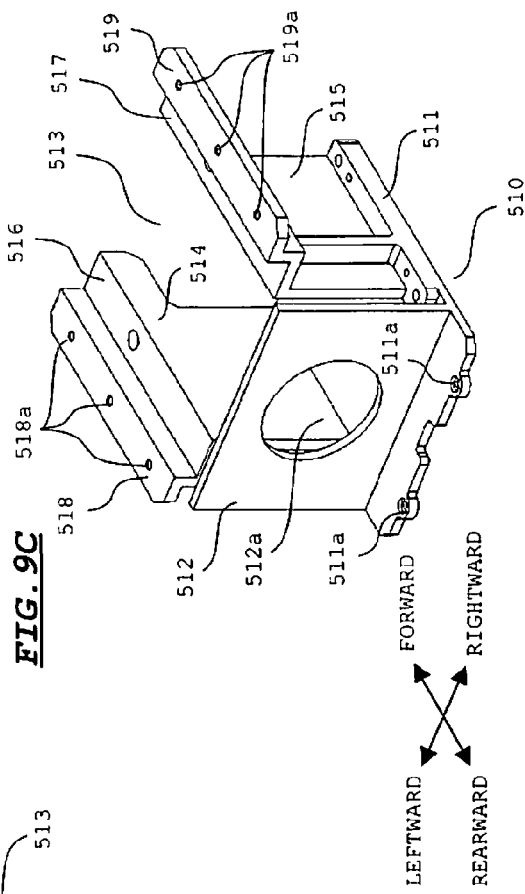
Figure 9A:
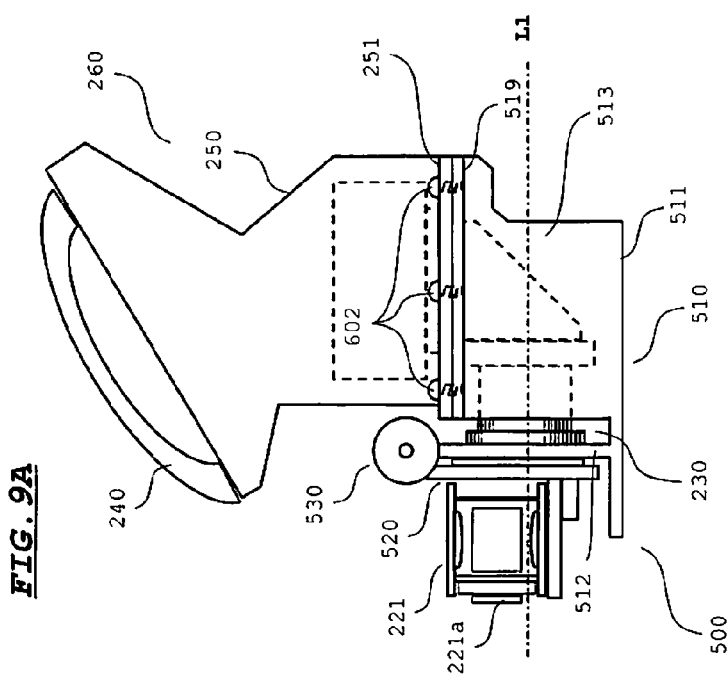

FIGS. 9A, 9B, and 9C are diagrams showing a structure as to how the projection optical unit 260 is mounted on the base member 510. FIG. 9A is a side view showing a state that the projection optical unit 260 is mounted on the base member 510. FIG. 9B is a side view showing an arrangement of the projection optical unit 260. FIG. 9C is a perspective view showing an arrangement of the base member 510.

As shown in FIG. 9B, the refractive optical system 230 is mounted on the housing 250 in such a manner that the front refractive optical unit 233 is accommodated in the housing 250, and the mirror case 234 and the rear refractive optical unit 231 are exposed downwardly. The curved surface mirror 240 is attached to an upper end of the housing 250. A flange portion 251 for mounting the housing 250 to the base member 510 is formed on both lateral surfaces on a lower portion of the housing 250. The projection optical unit 260 is assembled by mounting the refractive optical system 230 and the curved surface mirror 240 on the housing 250.

As shown in FIG. 9C, unlike the first embodiment, the base member 510 has an attachment block 513 for mounting the projection optical unit 260 at a forward position of a support plate 512. The attachment block 513 is integrally formed on a seat portion 511.

The attachment block 513 has a pair of leg portions 514 and 515. The rear refractive optical unit 231 and the mirror case 234 are accommodated in a space between the leg portions 514 and 515 when the projection optical unit 260 is mounted.

Holding portions 516 and 517, and flange portions 518 and 519 are formed on upper ends of the leg portions 514 and 515, respectively. The holding portions 516 and 517 have a height lower than the height of the flange portions 518 and 519 to accommodate a bottom portion of the housing 250. The flange portions 518 and 519 are respectively formed with each three threaded holes 518a and 519a.

A tip end of the rear refractive optical unit 231 is received in an opening 512a (see FIG. 9A). Unlike the first embodiment, since the rear refractive optical unit 231 is not fixed to the support plate 512, the support plate 512 is not formed with threaded holes 512b.

As shown in FIG. 9A, the projection optical unit 260 is fixed to the attachment block 513 by placing the projection optical unit 260 on the attachment block 513, and fastening the flange portion 251 with the flange portions 518 and 519 by screws 602. Similarly to the first embodiment, a fixing member 520 and a displacement mechanism portion 530 constituting a shift mechanism are mounted on the support plate 512.

Similarly to the first embodiment, in the second embodiment, as shown in FIG. 8B, the position of a projected image can be adjusted by shifting the imager unit 221. For instance, when the imager unit 221 is shifted from an upper position to a lower position, the imager unit 221 comes closer to the optical axis L1. As a result, the light ray position of image light emitted from the front refractive optical unit 233 is changed from the light ray position indicated by the broken line in FIG. 8B to the light ray position indicated by the solid line in FIG. 8B. Specifically, the light ray position of image light from the front refractive optical unit 233 comes closer to the optical axis L2, whereby the incident position of image light into the curved surface mirror 240 is displaced forwardly. Accordingly, the light ray position of image light reflected on the reflection mirror 240 and directed toward the floor surface is moved toward the projector. As a result, the position of an image projected on the floor surface is moved toward the projector (i.e. changed from the state of the image A in FIG. 8B to the state of the image B in FIG. 8B).

Thus, the position of a projected image can be easily adjusted by merely performing an operation of shifting the imager unit 221, without moving the projector main body.

As described above, in the second embodiment, the shift mechanism (the fixing member 520) for the imager unit 221 and the projection optical unit 260 are co-mounted on the base member 510. Accordingly, similarly to the first embodiment, the second embodiment is advantageous in precisely mounting an imager 221a and the projection optical unit 260.

Third Embodiment

FIGS. 10A and 10B are diagrams showing an arrangement of a projector in accordance with a third embodiment of the invention. FIG. 10A is a perspective side view showing an internal structure of the projector, and FIG. 10B is a side view showing an arrangement of a shift module 500.

As shown in FIG. 10A, the projector includes a cabinet 310, an optical engine 320, a refractive optical system 330, and a reflection mirror 340.

The optical engine 320 and the refractive optical system 330 are housed in the cabinet 310. The optical engine 320 generates image light modulated in accordance with an image signal, and the image light is entered into the refractive optical system 330.

The arrangement of the optical engine 320 is substantially the same as the arrangement of the optical engine 120 in the first embodiment. However, the optical engine 320 is different from the optical engine 120 in that an imager unit 321 is provided in the optical engine 320 at such a position that a center P of an effective display surface of an imager 321a is displaced downwardly from an optical axis L1 of the refractive optical system 330.

The refractive optical system 330 has a plurality of lenses. Image light from the imager unit 321 is entered into the refractive optical system 330 at a position downwardly displaced from the optical axis L1, and is emitted in an obliquely upward direction from a position upwardly displaced from the optical axis L1 of the refractive optical system 330.

Image light emitted from the refractive optical system 330 is passed through a projection opening 311 formed on a top surface of the cabinet 310, and entered into the reflection mirror 340 which is disposed upright on the top surface of the cabinet 310.

The reflection mirror 340 has a convex reflection surface of an aspherical shape or a free curved shape. Image light entered into the reflection mirror 340 is reflected and enlarged, and projected onto a screen.

Similarly to the first embodiment, the imager unit 321 is held on the shift module 500 to be displaceable in a vertical direction (a direction perpendicular to the optical axis L1).

Similarly to the foregoing embodiments, as shown in FIG. 10B, in the third embodiment, the refractive optical system 330 is co-mounted with a shift mechanism on a support plate 512 by fixing a flange portion 331 of the refractive optical system 330 to the support plate 512 by screws 603.

Unlike the first embodiment, in this embodiment, the imager unit 321 is arranged at such a position that the imager 321a is located at a lower position with respect to the optical axis L1. In view of this, the shift module 500 in this embodiment is configured in such a manner that the height position of a placement portion 522 of a fixing member 520, and the attachment position of the refractive optical system 330 (the height position of an opening 512a and threaded holes 512b) are adjusted, as shown in FIG. 10B.

Similarly to the foregoing embodiments, in the third embodiment, as shown in FIG. 10A, the position of a projected image on a screen can be adjusted by shifting the imager unit 321. For instance, when the imager unit 321 is shifted from an upper position to a lower position, the imager unit 321 is away from the optical axis L1. As a result, the light ray position of image light emitted from the refractive optical system 330 is changed from the light ray position indicated by the broken line in FIG. 10A to the light ray position indicated by the solid line in FIG. 10A. Specifically, the light ray position of image light from the refractive optical system 330 is away from the optical axis L1, whereby the incident position of image light into the reflection mirror 340 is displaced upwardly. Accordingly, the light ray position of image light reflected on the reflection mirror 340 and directed toward the screen is moved upwardly. As a result, the position of an image projected on the screen is moved upwardly (i.e. changed from the state of the image A in FIG. 10A to the state of the image B in FIG. 10A).

Thus, the position of a projected image can be easily adjusted by merely performing an operation of shifting the imager unit 321, without moving the projector main body.

As described above, in the third embodiment, the shift mechanism (the fixing member 520) for the imager unit 321, and the refractive optical system 330 are co-mounted on a base member 510. Accordingly, similarly to the first embodiment, the third embodiment is advantageous in precisely mounting the imager 321a and the refractive optical system 330.

Modification of Imager Unit

Figure 11:
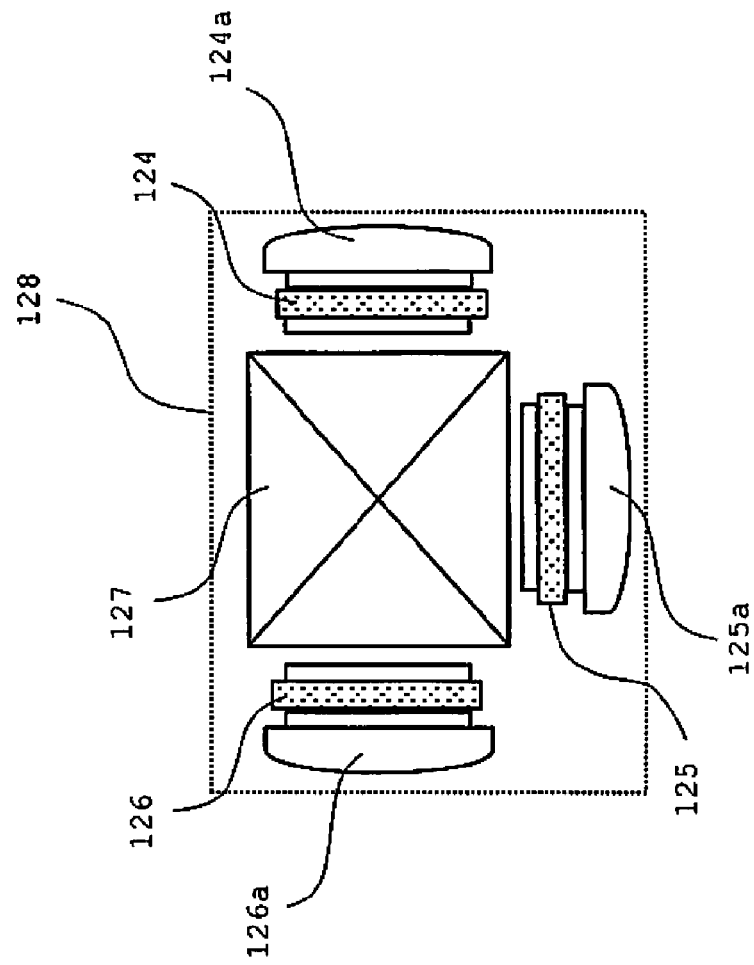
FIG. 11 is a diagram showing a modification of an imager unit.

FIG. 11 is a diagram showing an arrangement of an imager unit as a modification. In the first embodiment, the imager unit 121 is constituted of the liquid crystal panels 124, 125, and 126, and the dichroic prism 127. Alternatively, as shown in FIG. 11, an imager unit 128 may be constructed by integrally forming condenser lenses 124a, 125a, and 126a, as a part of a light guiding optical system, which are provided anterior to respective corresponding liquid crystal panels 124, 125, and 126, with the liquid crystal panels 124, 125, and 126. In the modification, the condenser lenses 124a, 125a, and 126a are shifted along with the liquid crystal panels 124, 125, and 126, and the dichroic prism 127.

Similarly to the first embodiment, the imager units in the second and the third embodiments may be configured into an imager unit substantially equivalent to the imager unit 128.

Modifications of Optical Engine

In the first embodiment, the transmissive liquid crystal panels 124, 125, and 126 are used as an imager in the optical engine 120. Alternatively, as shown in first through fourth modifications, an LCOS (Liquid Crystal on Silicon) as a reflective liquid crystal panel, or a DMD (Digital Micro Mirror Device) may be used as an imager. The modifications are also applicable to the second and the third embodiments.

First Modification

Figure 12A:
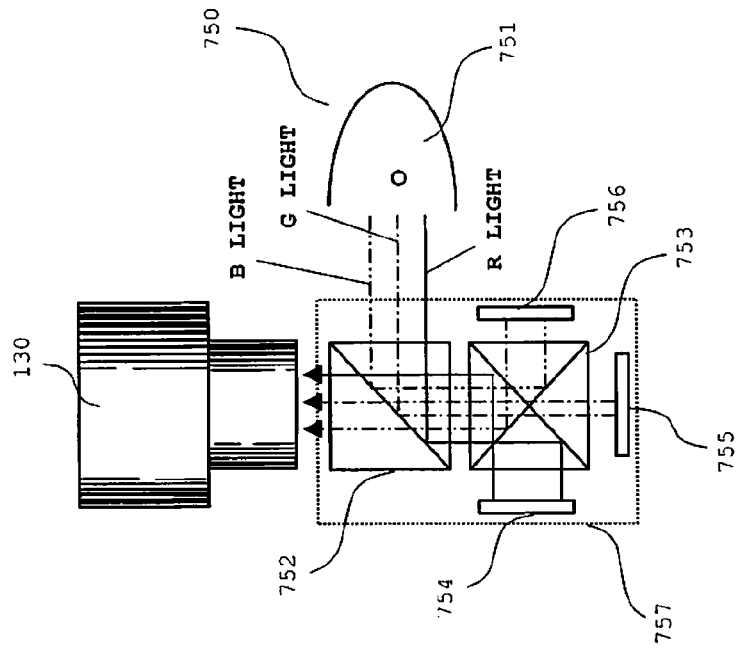
FIGS. 12A and 12B are diagrams respectively showing a first modification and a second modification of the optical engine.

FIG. 12A is a diagram showing an arrangement of an optical engine 700 as the first modification. In the first modification, an LCOS is used as an imager.

The optical engine 700 includes a light source 701; two mirrors 702 and 703, and two dichroic mirrors 704 and 705 constituting a light guiding optical system; and an imager unit 715 for modulating and combining light from the light guiding optical system.

An imager unit 715 is constructed by integrally forming three PBSs (polarized beam splitters) 706, 707, and 708, three LCOSs 709, 710, and 711, two half wavelength plates 712 and 713, and a dichroic prism 714.

The light source 701 has a lamp, a fly-eye lens, a PBS array, and a condenser lens. Light to be emitted from the light source 701 has its polarization direction aligned in one direction by the PBS array.

The light emitted from the light source 701 is reflected on the mirror 702, and entered into the dichroic mirror 704. The dichroic mirror 704 reflects R light and G light, and transmits B light out of the incident light.

The R light and the G light reflected on the dichroic mirror 704 are reflected on the mirror 703, and entered into the dichroic mirror 705. The dichroic mirror 705 reflects the G light and transmits the R light.

The R light transmitted through the dichroic mirror 705 is converted into S-polarized light with respect to the PBS 706, reflected on the PBS 706, and irradiated onto the LCOS 709. The LCOS 709 modulates the R light based on an image signal, and reflects the R light. In other words, the polarization direction of R light is rotated based on an image signal with respect to each of pixels constituting the effective display surface of the LCOS.

Then, the modulated R light is transmitted through the PBS 706 depending on a polarization direction, and has its polarization direction rotated while being transmitted through the half wavelength plate 712. Thereafter, the R light is entered into the dichroic prism 714.

The G light reflected on the dichroic mirror 705 is converted into S-polarized light with respect to the PBS 707, reflected on the PBS 707, and irradiated onto the LCOS 710. The LCOS 710 modulates the G light based on an image signal, and reflects the G light.

Then, the modulated G light is transmitted through the PBS 707 depending on a polarization direction, and entered into the dichroic prism 714.

The B light transmitted through the dichroic mirror 704 is converted into S-polarized light with respect to the PBS 708, reflected on the PBS 708, and irradiated onto the LCOS 711. The LCOS 711 modulates the B light based on an image signal, and reflects the B light.

Then, the modulated B light is transmitted through the PBS 706 depending on a polarization direction, and has its polarization direction rotated while being transmitted through the half wavelength plate 713. Thereafter, the B light is entered into the dichroic prism 714.

The R light and the B light are reflected on the dichroic prism 714, and the G light is transmitted through the dichroic prism 714. Accordingly, these three light is combined and entered into a refractive optical system 130 as image light.

The R light, the G light, and the B light modulated by the LCOSs 709, 710, and 711 are each P-polarized light with respect to the dichroic prism 714. In this case, the transmittance efficiency of G light is high, but the reflection efficiency of R light and B light as P-polarized light is low. In view of this, in the optical system shown in FIG. 12A, R light and B light are converted into S-polarized light through the half wavelength plates 713 and 714 to thereby increase the reflection efficiency of R light and B light with respect to the dichroic prism 714.

In the arrangement of the first modification, the imager unit 715 is placed on a placement portion 522 of a fixing member 520, and is vertically shifted by a shift mechanism.

Second Modification

Figure 12B:
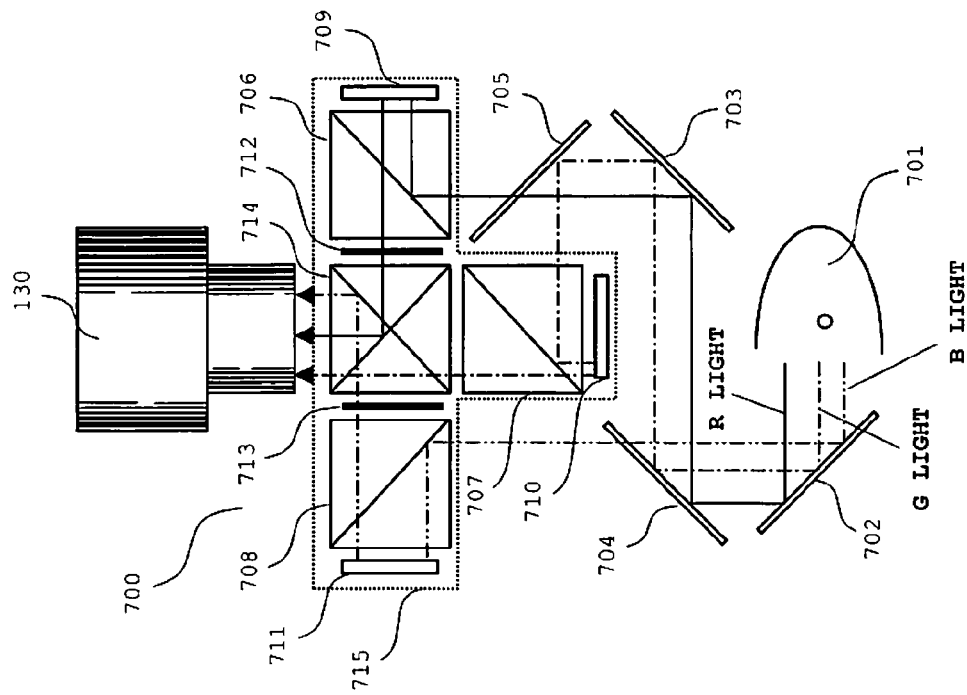

FIG. 12B is a diagram showing an arrangement of an optical engine 750 as the second modification. Similarly to the first modification, in the second modification, an LCOS is used as an imager.

The optical engine 750 includes a light source 751, and an imager unit 757 for modulating and combining light from the light source 751.

The imager unit 757 is constructed by integrally forming a PBS (polarized beam splitter) 752, a dichroic prism 753, and three LCOSs 754, 755, and 756.

The light source 751 has a lamp, a fly-eye lens, a PBS array, and a condenser lens. Light to be emitted from the light source 751 has its polarization direction aligned in one direction by the PBS array.

The light emitted from the light source 751 is converted into S-polarized light with respect to the PBS 752, reflected on the PBS 752, and entered into the dichroic prism 753. Out of the light entered into the dichroic prism 753, R light and B light are reflected on the dichroic prism 753, and irradiated onto the LCOSs 754 and 756, respectively. G light out of the incident light is transmitted through the dichroic prism 753, and irradiated onto the LCOS 755.

The R light, the G light, and the B light modulated by the respective LCOSs 754, 755, and 756 are entered into the dichroic prism 753 for color combination. Accordingly, the combined light is transmitted through the PBS 752 depending on a polarization direction, and entered into a refractive optical system 130 as image light.

In the arrangement of the second modification, the imager unit 757 is placed on a placement portion 522 of a fixing member 520, and is vertically shifted by a shift mechanism.

Third Modification

Figure 13A:
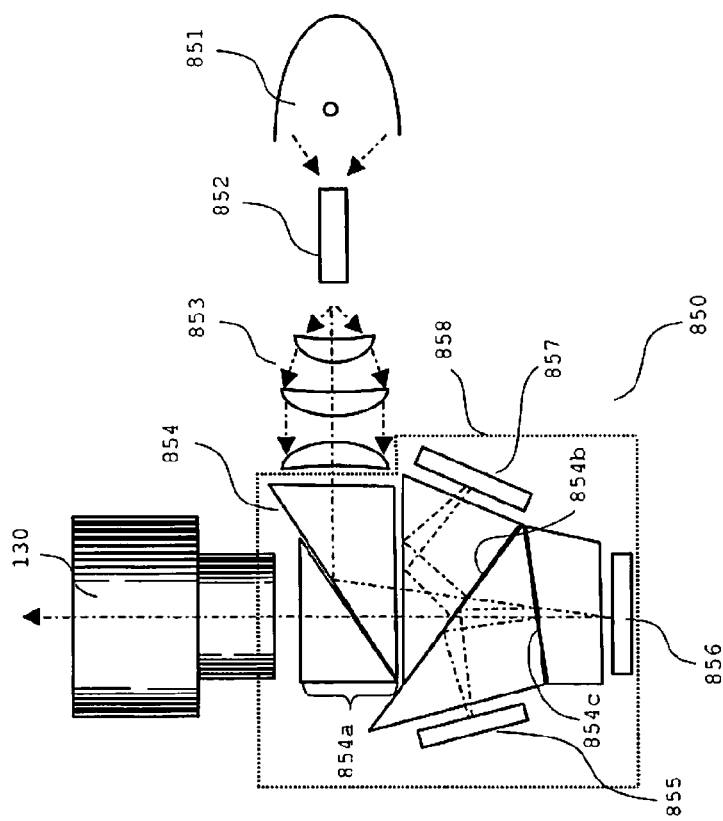
FIGS. 13A and 13B are diagrams respectively showing a third modification and a fourth modification of the optical engine.

FIG. 13A is a diagram showing an arrangement of an optical engine 800 as the third modification. In the third modification, a single-chip DMD is used as an imager.

The optical engine 800 includes a light source 801; a rod integrator 802, a color wheel 803, and a relay lens group 804 constituting a light guiding optical system; and an imager unit 807 for modulating and combining light from the light guiding optical system.

The imager unit 807 is constructed by integrally forming a TIR (Total Internal Reflection) prism 805 and a single-chip DMD 806.

Light emitted from the light source 801 has its illuminance distribution made uniform by the rod integrator 802 for incidence into the color wheel 803. The color wheel 803 has filters of red, green, and blue, and is constructed in such a manner that the filters are successively switched in a short time. The red filter transmits only R light, the green filter transmits only G light, and the blue filter transmits only B light.

R light, G light, and B light transmitted through the color wheel 803 with a time lag are passed through the relay lens group 804, reflected on the TIR prism 805, and irradiated onto the DMD 806. Then, after being modulated by the DMD 806, the light is transmitted through the TIR prism 805 and entered into a refractive optical system 130.

Since the color wheel 803 is switched at a high speed, images of R light, G light, and B light are combined and displayed on a screen as a single image.

In the arrangement of the third modification, the imager unit 807 is placed on a placement portion 522 of a fixing member 520, and is vertically shifted by a shift mechanism.

Fourth Modification

Figure 13B:
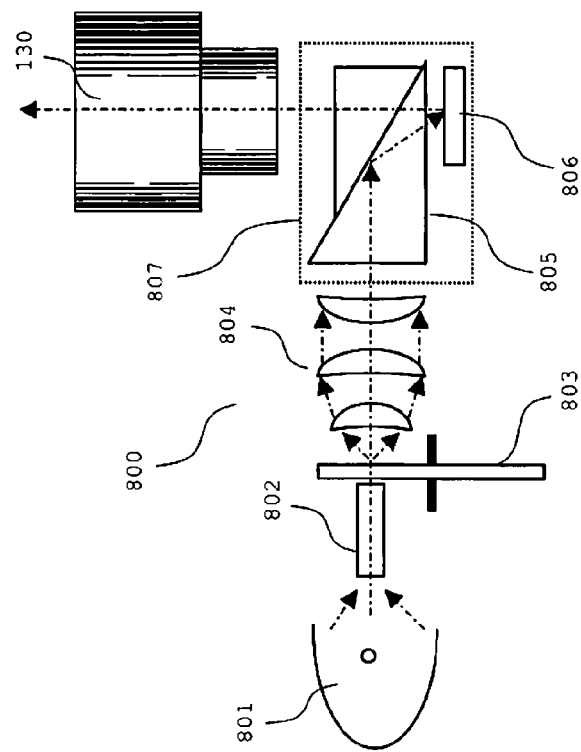

FIG. 13B is a diagram showing an arrangement of an optical engine 850 as the fourth modification. In the fourth modification, a three-chip DMD is used.

The optical engine 850 includes a light source 851, a rod integrator 852 and a relay lens group 853 constituting a light guiding optical system, and an imager unit 858 for modulating and combining light from the light guiding optical system.

The imager unit 858 is constructed by integrally forming a color separating/combining prism 854 for 3 DMDs (Digital Micro-mirror Devices), and three-chip DMDs 855, 856, and 857.

Light emitted from the light source 851 has its illuminance distribution made uniform by the rod integrator 852. Thereafter, the light is entered into a TIR prism 854*a* of the color separating/combining prism 854 for 3 DMDs through the relay lens group 853. The detailed arrangement of the color separating/combining prism 854 for 3 DMDs is recited in e.g. Japanese Unexamined Patent Application Publication No. 2006-79080A.

The light entered into the color separating/combining prism 854 for 3 DMDs is separated by dichroic films 854*b* and 854*c* constituting the color separating/combining prism 854 for 3 DMDs, and entered into each of the DMDs 855, 856, and 857. The R light, the G light, and the B light modulated by the respective DMDs 855, 856, and 857 have their optical paths combined by the color separating/combining prism 854 for 3 DMDs, and image light obtained by color-combining the R light, the G light, and the B light is entered into a refractive optical system 130 through the TIR prism 854*a*.

In the arrangement of the fourth modification, the imager unit 858 is placed on a placement portion 522 of a fixing member 520, and is vertically shifted by a shift mechanism.

Other Modifications

In the foregoing embodiments, the shift mechanism is constituted of the fixing member 520, and the displacement mechanism portion 530 incorporated with the eccentric cam 532. Alternatively, other members may constitute a shift mechanism. For instance, a shift mechanism may be constituted of a Z-axis stage.

In the foregoing, the embodiments of the invention have been described. The invention is not limited to the foregoing embodiments. Further, the embodiments of the invention may be changed or modified in various ways as necessary, other than the above, as far as such changes and modifications do not depart from the technical scope of the claims of the invention hereinafter defined.

What is claimed is:

1. A projection display device comprising:
an imager for modulating light from a light source based on an image signal;
a projection optical system for enlarging and projecting the light modulated by the imager onto a projection plane; and
a shift mechanism for displacing the imager in a direction intersecting with an optical axis of the projection optical system, wherein
the projection optical system and the shift mechanism are co-mounted on a base member,
wherein
the shift mechanism includes a fixing portion on which the imager is fixed, and a guide portion provided between the fixing portion and the base member, and for guiding the fixing portion in such a direction as to intersect with the optical axis of the projection optical system,
wherein
the base member has a wall-shaped support portion extending perpendicular to the optical axis, and
the fixing portion is displaceably mounted on a first side surface of the support portion through the guide portion, and the projection optical system is fixed to a side second surface of the support portion opposite to the first side surface,
wherein
the fixing portion includes a plate portion parallel to the first side surface, and a placement portion extending from the plate portion in a direction opposite to the first side surface, and for placing the imager thereon, and
the fixing portion further comprises a first reinforcing rib for preventing deformation of the placement portion.

2. The projection display device according to claim 1, wherein
the plate portion is formed with a second reinforcing rib extending in a direction of displacing the fixing portion.

* * * * *